(12) United States Patent
Bartscher et al.

(10) Patent No.: US 12,728,790 B2
(45) Date of Patent: Sep. 8, 2026

(54) HEADLAMP FOR VEHICLES

(71) Applicant: HELLA GMBH & CO. KGAA, Lippstadt (DE)

(72) Inventors: Sebastian Bartscher, Hamm (DE); Tobias Irmscher, Lippstadt (DE); Rainer Kauschke, Lippstadt (DE); Heinz Pollmann, Geseke (DE); Christian Smarslik, Münster (DE); Udo Venker, Gütersloh (DE); Carsten Wilks, Lippstadt (DE); Boris Kubitza, Möhnesee-Körbecke (DE)

(73) Assignee: HELLA GMBH & CO. KGAA, Lippstadt (DE)

(*) Notice: Subject to any disclaimer, the term of this patent is extended or adjusted under 35 U.S.C. 154(b) by 63 days.

(21) Appl. No.: 18/843,963

(22) PCT Filed: Feb. 23, 2023

(86) PCT No.: PCT/EP2023/054537
§ 371 (c)(1),
(2) Date: Sep. 4, 2024

(87) PCT Pub. No.: WO2023/169829
PCT Pub. Date: Sep. 14, 2023

(65) Prior Publication Data

US 2025/0196755 A1 Jun. 19, 2025

(30) Foreign Application Priority Data

Mar. 7, 2022 (DE) ........................ 102022105234.6

(51) Int. Cl.
*B60Q 1/14* (2006.01)

(52) U.S. Cl.
CPC ...... *B60Q 1/1423* (2013.01); *B60Q 2300/054* (2013.01); *B60Q 2300/3321* (2013.01)

(58) Field of Classification Search
None
See application file for complete search history.

(56) References Cited

U.S. PATENT DOCUMENTS 9,421,905 B2 * 8/2016 Hüster ................. B60Q 1/1423
9,566,897 B2 * 2/2017 Naber ...................... B60Q 1/04
(Continued)

FOREIGN PATENT DOCUMENTS

DE 102005041234 A1 3/2007
DE 102007052745 A1 5/2009
(Continued)

OTHER PUBLICATIONS

International Search Report and Written Opinion of the International Searching Authority for PCT/EP2023/054537, dated May 30, 2023 (11 pages).

*Primary Examiner* — Srinivas Sathiraju
(74) *Attorney, Agent, or Firm* — WARNER NORCROSS + JUDD LLP

(57) ABSTRACT

The invention relates to a headlamp for vehicles comprising an imaging unit and comprising an optical unit for generating a predefined light distribution, which has a plurality of light spots, the lights each being produced by projection of at least one light pixel of the imaging unit, and comprising a control unit containing a control signal for controlling the light pixels of the imaging unit and/or for controlling optical elements of the optical unit arranged upstream of the light pixels, a light focal point of the light distribution being arranged displaceably depending on the control signal, and the control signal being designed in such a way that the light focal point is arranged in a right edge region and/or left edge region of the light distribution.

13 Claims, 2 Drawing Sheets

(56) References Cited

U.S. PATENT DOCUMENTS 10,414,327 B2* 9/2019 Brede ........ F21S 41/141
10,585,671 B2* 3/2020 Buendgen ........ G06F 9/5038
11,358,518 B2* 6/2022 Unterweger ........ H05B 45/14
11,452,119 B2* 9/2022 Yang ........ H04L 1/0026
11,726,184 B2* 8/2023 Ferreira ........ G01S 17/894 356/4.01
2002/0005472 A1* 1/2002 Stam ........ B60Q 1/143 250/208.1
2003/0107323 A1* 6/2003 Stam ........ F21S 41/675 315/149
2013/0201705 A1* 8/2013 Schmidt ........ B60Q 1/122 362/466
2013/0286672 A1* 10/2013 Godecker ........ G01M 11/068 362/466
2015/0002015 A1* 1/2015 Hayakawa ........ G06V 20/584 315/82
2015/0022083 A1* 1/2015 Huster ........ B60Q 1/1423 315/82
2015/0092431 A1* 4/2015 Schneider ........ B60Q 1/085 362/543
2015/0210205 A1* 7/2015 Naber ........ B60Q 1/04 315/82
2018/0334086 A1* 11/2018 Brede ........ F21S 41/141
2019/0001868 A1* 1/2019 Kaino ........ B60Q 1/1423
2019/0018688 A1* 1/2019 Buendgen ........ G06F 9/4401
2019/0248272 A1* 8/2019 Goldschmidt ........ B60Q 1/115
2019/0273883 A1* 9/2019 Sakakibara ........ H04N 25/589
2019/0280025 A1* 9/2019 Sakakibara ........ H10F 77/953
2019/0373147 A1* 12/2019 Yamamoto ........ H04N 23/55
2020/0083297 A1* 3/2020 Joei ........ H04N 25/76
2020/0168648 A1* 5/2020 Kudoh ........ H10F 39/807
2020/0284883 A1* 9/2020 Ferreira ........ G01S 7/4815
2020/0357838 A1* 11/2020 Fukuyama ........ G02B 13/0045
2020/0382735 A1* 12/2020 Tagawa ........ H10F 39/8053
2021/0134868 A1* 5/2021 Tsujio ........ G02B 3/00
2021/0167519 A1* 6/2021 Ichihara ........ H10F 39/802
2022/0105862 A1* 4/2022 Unterweger ........ B60Q 11/005
2022/0128210 A1* 4/2022 Huester ........ F21S 41/663
2022/0223120 A1* 7/2022 Tsuboi ........ G09G 3/3233
2022/0224846 A1* 7/2022 Hasegawa ........ H04N 25/704
2022/0399391 A1* 12/2022 Yoshimoto ........ H04N 25/70
2023/0013088 A1* 1/2023 Kimura ........ G03B 17/02
2023/0098440 A1* 3/2023 Hashizume ........ H04N 25/443 348/169
2023/0188872 A1* 6/2023 Hanzawa ........ H04N 25/78 702/189
2025/0196755 A1* 6/2025 Bartscher ........ B60Q 1/085

FOREIGN PATENT DOCUMENTS

| | | | |
|---|---|---|---|
| DE | 102017207298 | A1 | 11/2018 |
| DE | 102020110900 | A1 | 11/2021 |
| EP | 2537709 | A2 | 12/2012 |
| EP | 2752615 | A1 | 7/2014 |
| EP | 3594058 | A1 | 1/2020 |
| WO | 2010049487 | A1 | 5/2010 |

* cited by examiner

HEADLAMP FOR VEHICLES

CROSS-REFERENCE TO RELATED APPLICATIONS

The present application is a national stage of International Application No. PCT/EP2023/054537, filed Feb. 23, 2023, which claims priority to German Patent Application 10-2022-105-234.6, filed Mar. 7, 2022, the disclosures of which are hereby incorporated by reference in their entirety.

FIELD OF THE INVENTION

The invention relates to a headlamp for vehicles comprising an imaging unit and comprising an optical unit for generating a predetermined light distribution, which has a plurality of light spots, the lights each being produced by projection of at least one light pixel of the imaging unit, and comprising a control unit containing a control signal for controlling the light pixels of the imaging unit and/or for controlling optical elements of the optical unit arranged upstream of the light pixels, a light focal point of the light distribution being arranged displaceably depending on the control signal.

BACKGROUND OF THE INVENTION

A headlamp for vehicles is known from DE 10-2017-100-818, which comprises an imaging unit and an optical unit for generating a predefined light distribution. The imaging unit comprises a plurality of light sources and aperture elements respectively assigned to them, each of which can be brought into a transmissive or blocking state by means of a control signal generated by a control unit. The aperture elements can, for example, be designed as liquid crystal elements. In order that different light distributions can be generated, the imaging unit is controlled by the control unit in such a way that a local shift of a light focal point can occur. This allows, for example, a cornering light distribution to be added to a predefined light distribution.

A headlamp for vehicles comprising an imaging unit and an optical unit for generating a predefined light distribution is known from DE 10-2018-107-214. The imaging unit comprises a plurality of light sources and collimator lenses assigned to each of them. The optical unit comprises a plurality of micro-optical elements arranged in a matrix-like manner, which are configured differently so that a light focal point of the light distribution is arranged in an area close to a light/dark boundary.

With newer low beam functions, such as AFLS (Adaptive Front-Lighting System), different light functions, such as highway lighting, city lighting, bad weather lighting or an adaptive high beam lighting, are switched on depending on the driving speed. The commonality of these light functions is that the light focal point of the light distribution is always arranged in a central area in front of the vehicle. The disadvantage of such a light distribution is that this can cause undesirable blinding of the driver when driving in town or on country roads, due to the concentration of light from approaching traffic and light reflections on the roadway.

SUMMARY OF THE INVENTION

The task of the invention is to further develop a headlamp in such a way that an edge region in the front of the vehicle is better illuminated in an effective manner. To solve this task, the control signal is designed in such a way that the light focal point is arranged in a right edge region and/or left edge region of the light distribution.

According to the solution according to the invention, a controlling of the headlamp takes place in such a way that a right and/or left edge region in the front of the vehicle, or alternatively a light distribution, is allocated a comparatively higher light intensity or alternatively a stronger illumination level than a central area of the light distribution. This is achieved by the fact that a light focal point is no longer arranged in a central or alternatively middle area of the light distribution—as is usually the case—but rather, when viewed horizontally, in a right and/or left edge region of the light distribution. The maximum illumination level is therefore preferably located in the area outside a carriageway of the vehicle, which is to say, in the area of a sidewalk or a cycle path, so that better object recognition is ensured. The controlling according to the invention can advantageously be used for headlamps that, in particular, generate a city light distribution. This inasmuch as when the vehicle is driving in a city, the central area of the light distribution can be supplied by the existing street lighting as well as, when compared to the edge region, by the reduced illumination level of the headlamp. The advantage of this is that a relatively homogeneous and wide light distribution can be generated that extends beyond the carriageway. If, for example, the street lighting is detected as being lacking or non-functional, the central area of the light distribution, for example, in country road situations, can be “filled in” with a modified gradient depending on a detection of objects in the road in ranges of 35 m to 65 m (or alternatively 120 m with elevated light/dark boundary, HDG, on highways or alternatively divided carriageways).

According to a preferred embodiment of the invention, the edge region of the light distribution in the area in the front of the vehicle is located outside a carriageway or outside a lane of the vehicle, so that adjacent parts, such as sidewalks, cycle paths, etc., can be illuminated.

According to a further development of the invention, the control signal is designed in such a way that the light distribution has illumination fields arranged in a fan shape on a measuring wall. In the direction of a distant region of the area in the front of the vehicle, the width of the illumination fields preferably reduces. A segmentation or alternatively gradation of the illumination levels takes place, wherein the illumination fields and/or the light spots each have similar illumination levels, wherein the distant areas are always illuminated more intensely than the immediate area in front of the vehicle. The illumination fields arranged in the horizontal edge region have the strongest illumination level (lighting strength) and the illumination field arranged in the central area has the lowest illumination level (lighting strength) when integrating the street lighting or alternatively the blinding lobes of approaching traffic. In particular in the case of light distribution in urban traffic, it is possible to increase safety, as the illumination fields of the edge region contain sidewalks or cycle paths that are not illuminated as strongly as the carriageway by external light sources. This makes it easier and quicker for the driver to recognize hazards such as pedestrians, scooter riders, cyclists, and e-scooter riders.

According to a further development of the invention, the light focal point comprises isolines of equal illumination level, the longitudinal direction of which is arranged at an acute angle to a horizontal orientation in the edge regions of the segments. This results in a fan-shaped arrangement of illumination fields with similar illumination levels on a measurement screen. The illumination fields thus extend in spaces defined by the vehicle track.

With increasing travel speed, an additional illumination level can be generated in the middle area (central area) of the area in the front of the vehicle so that the far-field illumination is still good, including in situations without street lighting. Speeds for activating this central far-field illumination are ≥25 km/h; 50 km/h in town areas or ≥60 km/h on country roads or ≥110 km/h on structurally divided carriageways.

According to a preferred embodiment of the invention, a boundary edge extends between the illumination field located in the edge region and an illumination field neighboring to the same, which has a lower illumination level than the illumination field of the edge region, along an edge of a vehicle track or the center line of two approaching carriageways or alternatively spatially divided carriageways, for example, of a highway. This ensures that the area in the front of the vehicle outside the vehicle track is more strongly illuminated than the vehicle track itself.

According to a further development of the invention, a detection unit, for example a camera, is provided for detecting an edge of the vehicle track. Alternatively, LiDAR and/or RADAR sensors can also be used and/or detailed knowledge of the course of the road and the self-localization of the ego-vehicle or alternatively of third-party vehicles or alternatively of their blinding lobes and/or the position and illumination of the street lighting can be used. The control signal is generated depending on the detection unit signal, which is used to effect the gradation of the illumination level at the boundary edge between the illumination field located in the edge region and the neighboring illumination field.

According to a preferred embodiment of the invention, the illumination width of the light distribution extends in a range between 45° and −60°, so that the illumination field in the left edge region is smaller than the illumination field in the right edge region for right-hand traffic.

According to a further development of the invention, the illumination field of the edge region transitions towards the horizontal into a light/dark boundary section in which the illumination level decreases continuously towards the horizontal of a measurement screen. This can compensate for pitching movements of the vehicle caused by unevenness on inner-city roads. The light/dark boundary movements associated with the pitching movements are less visible to the driver and are therefore less disturbing.

BRIEF DESCRIPTION OF THE DRAWINGS

One embodiment of the invention is elucidated in more detail below with reference to the drawings. Wherein.

DETAILED DESCRIPTION OF THE CURRENT EMBODIMENTS

Figure 1:
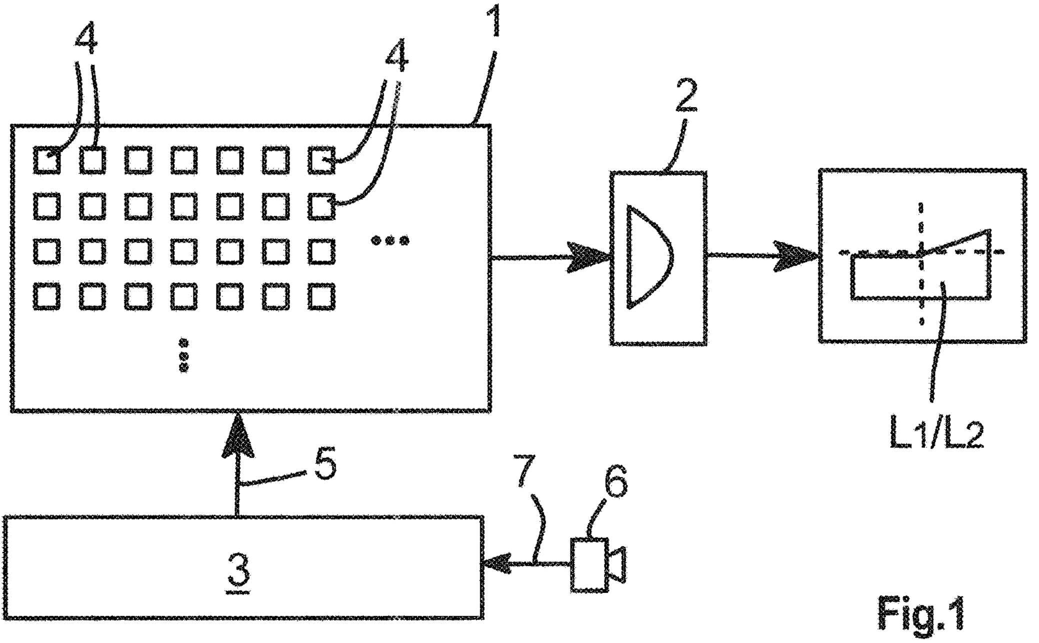
FIG. 1 shows a block diagram of a headlamp according to the invention.

A headlamp according to the invention is arranged in a front area of the vehicle and can be used to generate different light distributions $L_1$, $L_2$. By way of example, the headlamp can be used to generate a city light distribution $L_1$ or a country road light distribution $L_2$ or to generate a highway light distribution.

The headlamp substantially consists of an imaging unit 1, an optical unit 2 and a control unit 3.

The imaging unit 1 substantially consists of a matrix of individually controllable light sources 4, for example LED light sources, which are preferably arranged on a common circuit board. By way of example, the imaging unit 1 can comprise 30,000 light sources 4, so that different light distributions, for example low beam light distribution, high beam light distribution and the like, can be generated by controlling them individually, which is to say, moving them into an "on" or "off" state or into a dimming state. In the present embodiment example, the imaging unit 1 is controlled by means of a control signal 5 generated by the control unit 3 in such a way that the light pixels formed by the individual light sources 4 are mapped by the optical unit 2 to form light spots of a city light distribution $L_1$. In so doing, the light spots are preferably arranged next to each other or, if necessary, neighboring light spots overlap each other. The city light distribution $L_1$ is, for example, visible on a measurement screen.

The optical unit 2 can, for example, comprise a lens arrangement.

The control unit 3 receives a detection signal 7 from a detection unit 6, which is evaluated in the control unit 3 to determine whether the vehicle with the headlamp according to the invention is driving in a city. The detection unit 6 is installed in the vehicle carrying the headlamp and can, for example, be configured as a camera that supplies image information as the detection signal 5. If necessary, further parameters or operating parameters of the vehicle can be evaluated in order to recognize the presence of a drive through the city. In such a case, the light pixels 4 of the imaging unit 1 are controlled by the control signal 5 in such a way that the city driving illumination 8 shown in FIG. 2, which corresponds to the city light distribution $L_1$ on a measurement screen, is generated. If no city driving and/or no street lighting or alternatively town situation is detected, a different light function is generated depending on the driving situation of the vehicle and/or the ambient conditions, for example, a low beam light function, a non-blinding high beam light function, a highway light function or similar.

Figure 2:
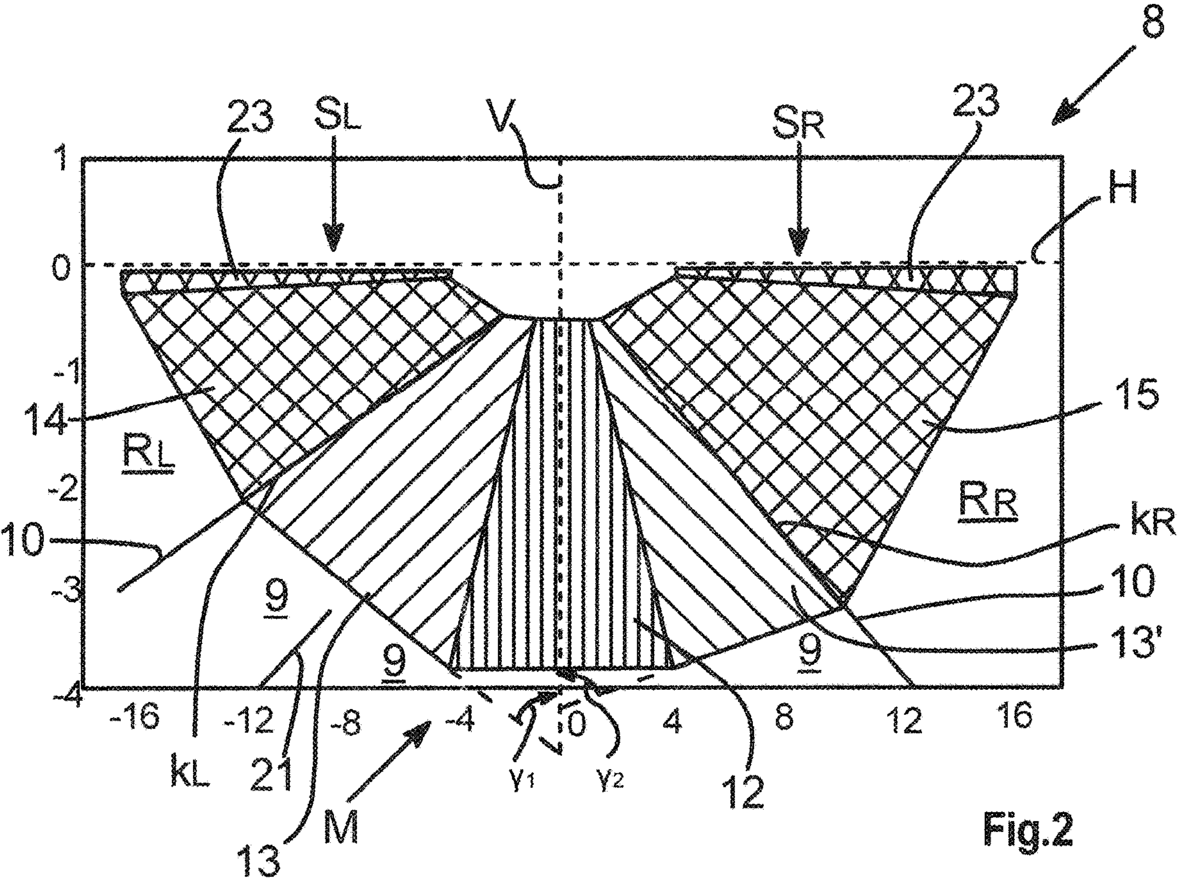
FIG. 2 shows a schematic representation of an illumination of an area in the front of the vehicle.
Figure 3:
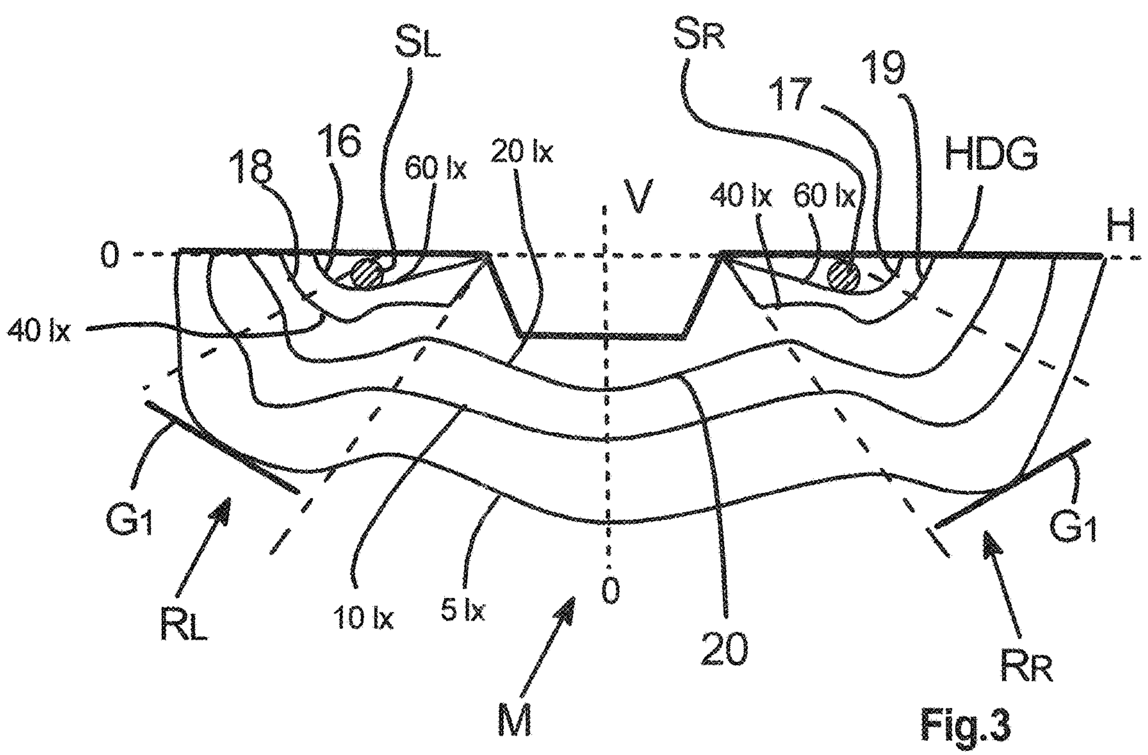
FIG. 3 shows a schematic representation of a light distribution $L_1$ on a measurement screen for generation of a city light distribution.

The city light distribution $L_1$ or city driving illumination 8 provided according to the invention as shown in FIG. 2 and FIG. 3 differs from the conventional city light distribution or alternatively conventional city driving illumination in that the control signal 5 acts on the imaging unit 1 in such a way that a light focal point $S_R$, $S_L$ is arranged in a right and/or left edge region $R_R$, $R_L$ of the light distribution $L_1$ or alternatively city driving illumination 8. In the present embodiment example, a left light focal point $S_L$ is located in a left edge region $R_L$ when viewed horizontally and a right light focal point $S_R$ is located in a right edge region $R_R$ of the light distribution $L_1$ or alternatively city driving illumination 8 (area in the front of the vehicle) when viewed horizontally.

The left edge region $R_L$ and the right edge region $R_R$ of the light distribution $L_1$ or alternatively city driving illumination 8 are respectively located outside a carriageway 9, which is delimited by edge-side lane markings 10. The edge regions $R_L$ and $R_R$ of the city light distribution therefore, for example, illuminate a sidewalk or cycle path when driving through the city. The maximum illumination level of the left half or the right half of the light distribution $L_1$ (city driving illumination 8) is located in these edge regions $R_L$ and $R_R$.

As can be seen from FIG. 2, the city driving illumination 8 consists of a plurality of illumination fields 12, 13, 13', 14, 15 arranged in a fan shape, in each of which light spots are preferably arranged with the same illumination level. A central illumination field 12 is arranged in a central area M of the city light distribution $L_1$ or alternatively of the city driving illumination 8. A longitudinal central plane or alternatively a longitudinal central axis of the vehicle runs in this central illumination field 12. On the left side of the illumination field 12, there is an adjoining transitional illumination field 13 (longitudinal hatching in FIG. 2), which in turn is adjoined on a side facing away from the central illumination field 12 by a left end illumination field 14 (cross-hatching in FIG. 2). The left illumination field 14 is located in a left edge region $R_L$ of the light distribution $L_1$ or alternatively city driving illumination 8.

On the right side of the central illumination field 12, there is an adjoining transitional illumination field 13' (longitudinal hatching in FIG. 2), which in turn is adjoined on a side facing away from the central illumination field 12 by a right end illumination field 15 (cross-hatching in FIG. 2). The right illumination field 15 is located in a right edge region $R_R$ of the light distribution $L_1$ or alternatively city driving illumination 8.

The central illumination field 12 has light spots with the lowest illumination level. The left end illumination field 14 and the right end illumination field 15 have light spots with the highest illumination level. The transitional illumination fields 13, 13' have light spots, the illumination level of which is stronger than that of the central illumination field 12, but lesser than the illumination level of the left end illumination field 14 and the right end illumination field 15.

It can be seen that neighboring illumination fields 12, 13, 13', 14, 15 have light spots of different illumination level.

FIG. 3 shows that a left light focal point $S_L$ is located in the left end illumination field 14 and a right light focal point $S_R$ is located in the right end illumination field 15. It can be seen that a light/dark boundary HDG of the light distribution $L_1$ extends in the left edge region 14 and in the right edge region 15 in an area close to the horizontal H, whereas in the center area 12 it extends away from the horizontal H. Light spots of the left illumination field 14 and of the right illumination field 15, which are located in an area close to the light/dark boundary HDG, have a greater illumination level than the light spots of the center illumination field 12, which are located in an area close to the light/dark boundary HDG. This is made clear in FIG. 3 by the course of isolines 60 lx, which are marked with the reference numbers 16 and 17, and the course of the isolines 40 lx, which are marked with the reference numbers 18 and 19. The isoline 20 of the central area close to the light/dark boundary HDG only has an illumination level of 20 lx.

It is understood that within the illumination fields 12, 13, 13', 14, 15, the illumination level of the light spots increases in the direction of the horizontal H or light/dark boundary HDG, so that a homogeneous light distribution is ensured over the depth of the area in the front of the vehicle.

As can be seen from FIG. 2, the illumination fields 12, 13, 13', 14, 15 taper in the direction of the light/dark boundary HDG or in the direction of a central point of the light distribution $L_1$ or alternatively of the city driving illumination 8.

FIG. 3 also shows that illumination level transitions between the peripheral illumination fields 14, 15 on the one hand and the central illumination field 12 on the other, which is to say, in the transitional illumination fields 13, 13', do not occur abruptly, but rather according to a gradient $G_1$ with a comparatively mild pitch (mild pitch in terms of amount). This ensures a smooth transition between the end illumination fields 14, 15 on the one hand and the central illumination field 12 on the other. This smooth transition extends substantially in the transitional illumination fields 13, 13'.

Preferably, the illumination level transitions between the illumination fields 12, 13, 13', 14, 15 are not abrupt, but rather extend along a curved or straight line with a comparatively mild pitch. In this way, a smooth transition is created between the neighboring illumination fields 12, 13, 13', 14, 15.

FIG. 2 also shows that a left boundary edge kL, which extends between the left end illumination field 14 and the left transitional illumination field 13, and a right boundary edge kR, which extends between the right end illumination field 15 and the right transitional illumination field 13', sweep over the vehicle marking 10 on the edge of the carriageway 9. This means that the carriageway 9 is less strongly illuminated than the left edge region $R_L$ and the right edge region $R_R$, which are located outside the carriageway 9.

FIG. 2 also shows that a central lane marking 21, which extends in the middle of the carriageway 9, falls in the left transitional illumination field 13.

The city light distribution $L_1$ according to the invention has an increased illumination width in the horizontal direction compared to conventional city light distributions. In relation to a vertical V, a left illumination width section extends up to an angle $\gamma_1$ of 60° and a right illumination width section extends up to an angle $\gamma_2$ of 45°. The illumination width therefore extends from +45° to −60°.

A light/dark boundary HDG of the light distribution $L_1$ or alternatively of the city driving illumination 8 is substantially formed by the left end illumination field 14 and the right end illumination field 15. In order that a pitching movement of the vehicle caused by unevenness of the carriageway 9 does not have a disturbing effect on the driver, the illumination level of the light spots facing the horizontal H is reduced in such a way that the left illumination field 14 and the right illumination field 15 transition to the horizontal H under a relatively flat illumination level gradient $G_1$. This means that the illumination level of the end illumination fields 14, 15 is gradually and/or continuously reduced in the direction of the horizontal H.

In the present embodiment example, the left end illumination field 14 and the right end illumination field 15 each have a light/dark boundary section 23, which extends with an increasing vertical width from the central area M to the edge region $R_L$ or $R_R$.

According to an alternative embodiment of the invention, the width of the light/dark boundary section 23 can also be constant.

By way of example, if the detection unit 6 has detected a failure of the street lighting, the imaging unit 1 is controlled in such a way that a conventional city light distribution is generated in which the light focal point is located in the central area M. This ensures that the light distribution $L_1$ according to the invention is only generated if there is actually additional external lighting in the carriageway.

According to an alternative embodiment of the invention not shown, the imaging unit 1 can also comprise other individually controllable light control elements, such as liquid crystal elements.

According to a further embodiment of the invention, the optical unit 2 can also comprise a micromirror unit, so that the light distribution is generated depending on the position of the micromirrors arranged in a matrix.

Alternatively, the left end illumination field 14 or the right end illumination field 15 can also be missing in the light distribution $L_1$ or in the city illumination 8.

Figure 4:
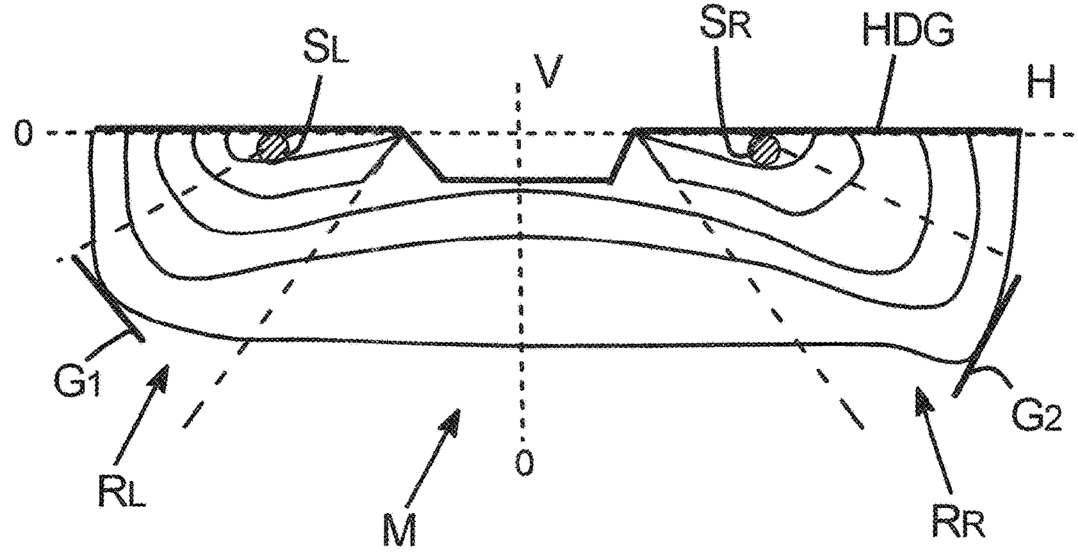
FIG. 4 shows a schematic representation of a light distribution $L_2$ on a measurement screen for generation of a country road light distribution.

The substantial difference between a country road light distribution $L_2$ shown in FIG. 4 and the city light distribution $L_1$ shown in FIG. 3 is that in a transition area between the right end illumination field 15 and the central illumination field 12, the transition takes place with a relatively abrupt transition light gradient $G_2$. This ensures greater illumination of the right-hand area in the front of the vehicle.

LIST OF REFERENCE NUMERALS

1 imaging unit
2 optical unit
3 control unit
4 light sources
5 control signal
6 detection unit
7 detection signal
8 city driving illumination
9 carriageway
10 edge-side lane marking
12 central illumination field
13, 13' transitional illumination fields
14 left end illumination field
15 right end illumination field
16 isoline
17 isoline
18 isoline
19 isoline
20 isoline
21 central lane marking
HDG light/dark boundary
23 light/dark boundary section
V vertical
H horizontal
$\gamma_1$, $\gamma_2$ angle
M central area
kL, kR boundary edge
$R_L$, $R_R$ edge region
$S_L$, $S_R$ light focal point
$L_1$, $L_2$ light distribution
$G_1$, $G_2$ transition gradient The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A headlamp for a vehicle, the headlamp comprising:

an imaging unit and an optical unit for generating a light distribution, which has a plurality of light spots, each of the plurality of light spots being produced by projection of at least one of a plurality of light pixels of the imaging unit; and a control unit being configured to receive a detection signal from a detection unit, the detection signal being based on a detection of street lighting along a vehicle track of the vehicle, the control unit being further configured to generate a control signal for controlling the plurality of light pixels or for controlling optical elements of the optical unit arranged upstream of the plurality of light pixels based on the detection signal from the detection unit, wherein a light focal point of the light distribution is displaceable depending on the control signal from the control unit, wherein the light distribution includes a central area, a transition region, and an edge region, the edge region being a right edge region or a left edge region, wherein the control signal causes the light focal point to be arranged in the right edge region or the left edge region of the light distribution or the central area of the light distribution, wherein, in response to the street lighting being detected along the vehicle track by the detection unit, the control unit causes the light focal point to be arranged in the left edge region or the right edge region of the light distribution, such that an area outside the vehicle track is illuminated more strongly than an area within the vehicle track, and wherein, in response to the street lighting not being detected along the vehicle track by the detection unit, the control unit causes the light focal point to be arranged in the central area of the light distribution.

2. The headlamp of claim 1, wherein the edge region of the light distribution is located outside a carriageway of the vehicle.

3. The headlamp of claim 1, wherein the control signal causes the light distribution to have illumination fields arranged in a fan shape on a measuring wall, wherein an illumination field in the right edge region or the left edge region has a greater light intensity than an illumination field in the central area of the light distribution.

4. The headlamp of claim 3, wherein the control signal causes the plurality of light spots in the illumination fields to have an increasing illumination level in a horizontal direction or in a direction of a light/dark boundary.

5. The headlamp of claim 4, wherein each of the plurality of light spots have an illumination level, and wherein the control signal causes the illumination level of the plurality of light spots close to the light/dark boundary, which are arranged in the right edge region or the left edge region of the light distribution, to be greater than the illumination level of the plurality of light spots located in the central area of the light distribution.

6. The headlamp of claim 5, wherein the control signal causes isolines of light spots close to the light/dark boundary, which are arranged in the right edge region or the left edge region of the light distribution, extending exclusively in the right edge region or the left edge region.

7. The headlamp of claim 1, wherein the control signal causes a transition gradient between a right end illumination field and a central illumination field or a transition gradient between a left end illumination field and the central illumination field.

8. The headlamp of claim 1, wherein the plurality of light spots define an illumination level, and wherein the control signal causes a transition gradient of the illumination level in the transition region between a right edge illumination field and a central illumination field to be greater than a transition gradient of the illumination level in the transition region between a left end illumination field and the central illumination field.

9. The headlamp of claim 1, wherein a boundary edge between an illumination field in the left edge region and a neighboring illumination field in front of the vehicle extends along an edge of the vehicle track.

10. The headlamp of claim 1, wherein the detection unit is configured to detect an edge of the vehicle track; and the control signal is generated depending on the detection signal of the detection unit, so that a boundary edge between the right edge region or the left edge region and a neighboring illumination field coincides with the edge of the vehicle track.

11. The headlamp of claim 1, wherein the light distribution defines a width that extends in an angle range between +45° and −60° in a horizontal direction.

12. The headlamp of claim 1, wherein the light distribution defines an illumination field, and wherein the illumination field at the left edge region or the right edge region of the light distribution comprises a light/dark boundary section facing horizontal, the light spots of which have an illumination level which decreases continuously in a horizontal direction.

13. The headlamp of claim 1, wherein the light/dark boundary section extends away from a central area to the left edge region or the right edge region, forming an enlarged vertical width.

* * * * *